Aug. 9, 1932.  W. D. FOSTER ET AL  1,871,231
CARRIER FOR MATERIAL AND SPINDLE THEREFOR
Original Filed Feb. 23, 1927  2 Sheets-Sheet 1
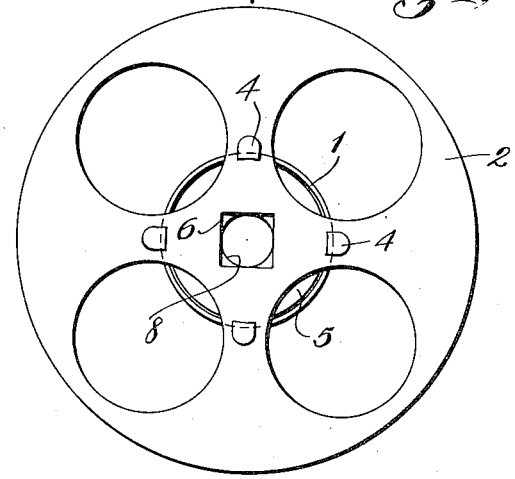
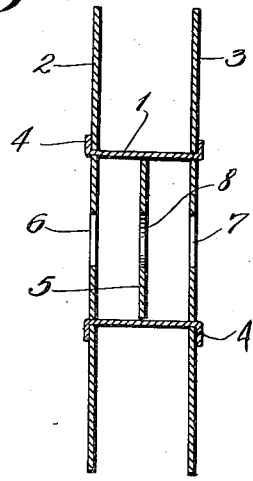
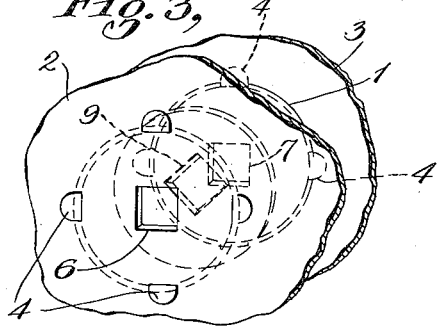
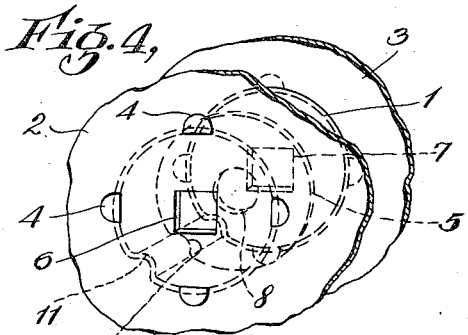
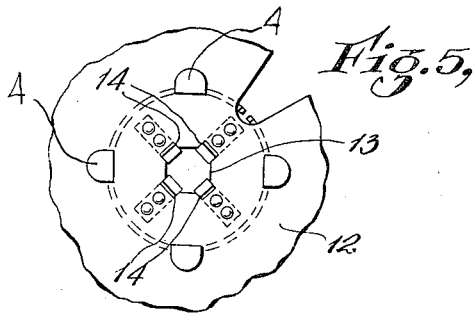
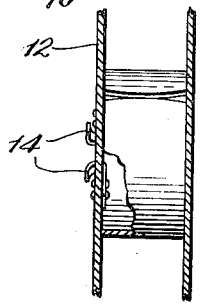
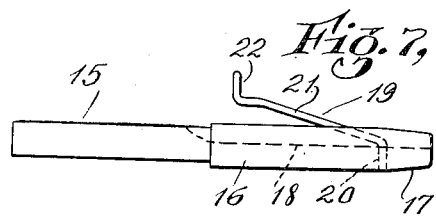
INVENTORS
WARREN DUNHAM FOSTER
CLARKSON ULYSSES BUNDICK
BY Waldo G. Morse
ATTORNEYS.

Aug. 9, 1932.  W. D. FOSTER ET AL  1,871,231
CARRIER FOR MATERIAL AND SPINDLE THEREFOR
Original Filed Feb. 23, 1927    2 Sheets-Sheet 2
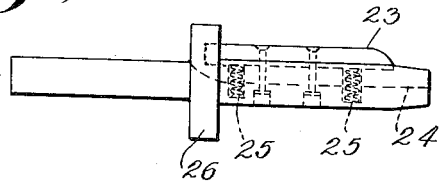
Fig. 9,
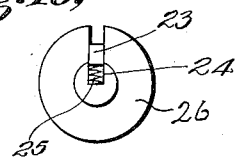
Fig. 10,
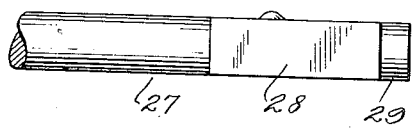
Fig. 11,
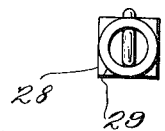
Fig. 12,
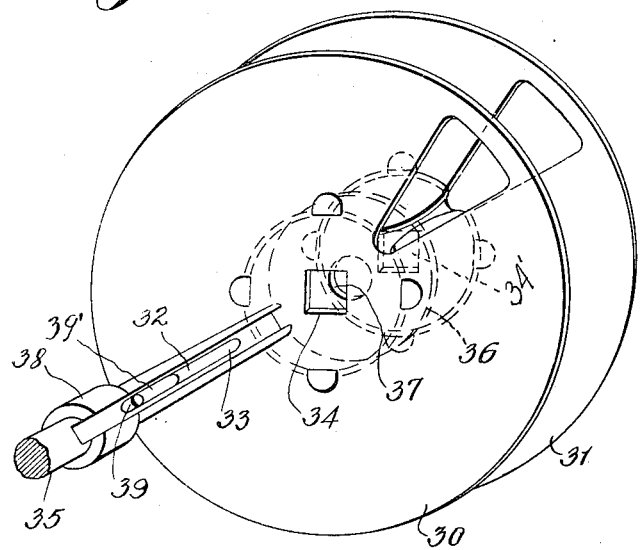
Fig. 13,
INVENTORS
WARREN DUNHAM FOSTER
CLARKSON ULYSSES BUNDICK
BY Waldo G. Morse
ATTORNEYS.

Patented Aug. 9, 1932

1,871,231

UNITED STATES PATENT OFFICE

WARREN DUNHAM FOSTER, OF WASHINGTON TOWNSHIP, BERGEN COUNTY, NEW JERSEY, AND CLARKSON ULYSSES BUNDICK, OF WHITE PLAINS, NEW YORK, ASSIGNORS, BY MESNE ASSIGNMENTS, TO KINATOME PATENTS CORPORATION, OF NEW YORK, N. Y., A CORPORATION OF NEW YORK

CARRIER FOR MATERIAL AND SPINDLE THEREFOR

Original application filed February 23, 1927, Serial No. 170,181. Divided and this application filed January 15, 1929. Serial No. 332,712.

The present invention relates broadly to the art of winding and reeling, and more particularly to an improved structure particularly adapted to serve as a carrier either for delivering or receiving films in connection with photographic, projecting, printing, sound recording, sound reproducing, or other film handling apparatus in which it is desirable to pass a film from one reel or carrier to another.

The present invention is a divisonal application from our copending application Serial Number 170,181 filed February 23, 1927.

It has been proposed in the art to which the present invention relates to provide special reels or carriers or apparatus with special spindles or mounts, with the object either of providing carriers utility of which is limited to use with a particular apparatus, or the structure of which is such that it can be applied to such apparatus only in a predetermined manner.

It is obviously desirable for many reasons to provide a carrier of such nature that the owner or operator of a given apparatus is not restricted in his selection of films by reason of special carriers or mountings therefor, and the present invention has for one of its objects to provide an improved carrier adapted to cooperate with the different types of spindles at present available as well as with improved spindles of the general nature to which reference is hereinafter made.

It is often desirable to be able to position a carrier on a support with either side outwardly. Certain projectors now on the market require films reeled in one way, and others require opposite reeling. Moreover, because of the wide amateur use of so-called reversed negatives, with the image bearing emulsion on the side opposite to that upon which it ordinarily appears in professional positive prints, a change in the position of the carrier is frequently necessary within the same apparatus. With certain constructions now in use, the reversal of the carrier is prevented either by reason of the structure of the carrier or of that of the spindle with which it cooperates or both. An object of the present invention is to provide a carrier which may be positioned with either side outwardly.

An object of the present invention is to provide a carrier which includes a compensating element for establishing a suitable driving connection with spindles of varying dimensions and characteristics, such element preferably also serving to position the carrier properly on the spindle when the two are placed in assembled relation, and also to maintain it in the required position during the operation thereof.

A further object of the present invention is to provide a carrier with openings of uniform cross-sectional area. With such a construction, the maximum dimensions of the spindle receiving opening may be determined with respect to the maximum dimensions of the mount portions now provided in spindles, and suitable means may be added to compensate for differences in dimensions and contours between the mount portion of the spindle and the spindle receiving opening of the carrier and to prevent undue tilting or twisting movement therebetween.

A further object of the present invention is to provide a carrier which under modern manufacturing conditions can be constructed at relatively low cost and yet be efficient and adapted for use by unskilled operators without difficulty. At the present time, film carriers are ordinarily constructed from stampings. The component parts are stamped from sheet material, and joined in various ways. Accuracy in such assembly and fitting is often sacrificed to economy. The addition of compensating elements of relatively inaccurately made carriers add practically nothing to the cost and give them the advantages of proper positioning, snug fit, and effective driving connection relative to the spindle otherwise impossible except in carriers which are much more expensive.

The present invention is exemplified and illustrated in the accompanying drawings in connection with carriers adapted for use with spindles in film handling apparatus. It will be apparent, however, that the utility of the invention is not limited in this respect, and that certain features of the invention are adapted to the winding or reeling of a wide variety of materials.

In the drawings:

Figure 1 is a side elevation of a carrier with a compensating element of a disc type; Figure 2 is a section of the same taken upon the line 2—2 of Figure 1.

Figure 3 is a perspective view partly broken away showing a compensating disc of a preferred modification.

Figure 4 is a similar view showing a compensating element of the disc type and means preventing the rotation thereof within the hub structure.

Figure 5 is a partial side elevational view of a carrier embodying a compensating element of a yielding type, and Figure 6 is an end view, partly broken away, of the same.

Figure 7 is a side elevation of one form of spindle and Figure 8 is an end elevation thereof.

Figure 9 is a side elevation of another form of spindle and Figure 10 is an end elevation thereof.

Figure 11 is a side elevation of another form of spindle, for purposes of illustration only, and Figure 12 is an end elevation of the same.

Figure 13 is an isometric view of a carrier with a compensating element of the disc type in position to be applied to a spindle of a construction slightly modified over that shown in Figure 7.

In carrying out our invention, we may provide a carrier formed of a hub 1 which supports in spaced parallelism side plates 2 and 3. In accordance with modern manufacturing practice, we may prefer to construct such a hub of sheet metal with suitable lugs 4 adapted to hold the side plates in the desired position. Freely movable within such hub, we may place the compensating element 5 preferably in the form of a disc. Within such side plates, we may provide coaxial openings 6 and 7 preferably identical in size and shape for the reception of the supporting spindle. Such openings 6 and 7 may be of any desired size or contour, and, according to one preferred form of our invention, are made square.

With such disc 5, we may place an opening 8, coaxial with such openings 6 and 7, of any desired size and contour adapted for cooperation with reel mount surfaces of the various type or types of spindles with which the reel is to be used. Figure 1 shows such compensating element constructed with a round opening 8 and Figure 3 shows a similar compensating element with a square opening 9.

Although such compensating disc is freely movable within the interior barrel of the hub, we may prefer to make it of a diameter sufficiently near that of the interior surface of the hub so that there is some friction between its edges and such interior surface.

As is clearly shown in Figure 4 of the drawings, we may prefer to form the compensating disc with a notch 10 which cooperates with the depression 11, formed within the interior of the hub, to limit the rotation of the disc within the hub, this depression also serving, if desired, as means for attaching film to the reel.

As is clearly shown in Figures 5 and 6 of the drawings, the compensating element may be of a yielding type. To one or both sides 12 of the carrier, adjacent the spindle receiving opening 13, we may attach a compensating element 14, constructed of spring material and projecting into such opening. From one to four such compensating elements may be employed, depending upon the weight of the carrier. Such compensating elements, if desired may be formed of one piece. Under ordinary conditions, we have found two such elements, placed opposite each other, to be sufficient.

It will be readily understood by those skilled in the art that carriers constructed according to our invention may be employed with many types of spindles now known in the art and with those described in our above-mentioned co-pending application.

As shown in Figures 7 and 8, such a spindle 15 may be formed with a carrier receiving or mount portion 16 preferably substantially cylindrical throughout the entire length thereof and of substantially uniform diameter. The outer end of the spindle may, if desired, be tapered as indicated at 17 to facilitate the initial entry of the spindle into the carrier. Extending longitudinally of a portion of the spindle is a groove 18 within which is mounted in any desired manner a combined positioning, holding and driving means 19 herein illustrated as comprisng a spring member free at one end and having its opposite end 20 suitably secured in the spindle. This member intermediate its ends is provided with an inclined portion 21 terminating in an angular projection 22.

The modification illustrated in Figures 9 and 10 comprises an elongated latch 23 normally urged outwardly in the slot 24 by means of springs 25. The spindle may be provided with a shoulder 26 for limiting the travel of the carrier onto the spindle or to assist in positioning it. It will be apparent that different ends of the latch may move outwardly varying amounts, and thereby compensate for differences in diameter between the openings in either or both of the carrier walls and the outer diameter of the mount portion of the spindle.

Carriers constructed according to the present invention may be used also upon a spindle of the type illustrated in Figures 11 and 12. Such spindle 27 is formed of a longitudinally varied carrier mount surface, comprising a square inner portion 28 terminating in an outer round portion 29. Carriers especially constructed for cooperation with such spindles have longitudinally varied spindle receiving portions, at least a certain section of which differs substantially from the uniform spindle receiving portion of carriers constructed according to applicants' invention.

Cooperation between a spindle of a type slightly modified over that shown in Figure 7 and a carrier with a compensating element of the disc type is illustrated in Figure 13.

As the carrier is placed upon the spindle 35, over the end thereof, the square opening 34, the length of each side of which may be greater than the diameter of the spindle, in the carrier side 30 will pass over the inclined portion 32 of the spring 33. The positioning of the carrier upon the spindle may be accomplished by the coaction of the bearing of the spring 33 upon the periphery of the opening 37, and the bearing of the periphery of the disc 36 upon the inside of the hub, or the upwardly extending portion 39 or the collar 38 or both may be utilized to assist in such positioning.

It will be understood that such disc 36 in cooperation with the spindle member 33 will compensate for whatever dimensional differences may exist between the spindle receiving openings 34 and 34' and the diameter of the spindle 35, and maintain the carrier in completely operative relation with the spindle. It will be understood also that the disc 36, in cooperation with the engagement of the section 39' of the spring element 33 with the carrier side 30, will establish and maintain contact with the spring element 33 of the spindle whereby the carrier may be driven by the spindle.

The method of operation of carriers constructed according to our invention with any of the other types of spindles illustrated herein will be rendered obvious by an examination of the drawings.

When such a carrier with a compensating element of the disc type is used with a spindle of the type illustrated by Figures 9 and 10, inward movement of the carrier is limited by engagement between the compensating element and the spring pressed latch 23 and, if desired, between the side of the carrier and the shoulder 26. Such engagement between disc and latch in addition to that afforded by one or more of the carrier sides compensates for the diffeernces of dimension or contour to which reference has previously been made and provides driving connection between the spindle and the carrier.

When such a carrier is used with a spindle of the type illustrated in Figures 11 and 12 the opening in the inner side wall of the carrier establishes and maintains positioning and driving contact with the square portion 28 of the spindle and the compensating element establishes and maintains positioning contact with the round portion 29.

It will be readily understood that the disc 8 may be of any desired thickness so that the side of the carrier may be positioned thereby at any desired point between the junction of the square portion 28 of the spindle, as illustrated in Figures 11 and 12, and the outer or right hand extremity of the round portion 29, thus compensating for dimensional differences from the standpoint of the relative lengths of such portions. Thus the construction of a carrier which may be used with a spindle of a relatively long round portion or of another carrier which may be used with a spindle with a relatively short round portion is made possible. It will be readily understood that in any case a carrier constructed in accordance herewith may be pushed upon the spindle with either side outwardly, thus affording the advantages to which reference has hereinbefore been made and is made hereafter.

For the sake of further illustration of the effectiveness of our invention in compensating for dimensional differences while still permitting a carrier to be applied either side outwardly, it will be assumed that a spindle, as illustrated in Figures 11 and 12, is constructed with a round portion 29 smaller in diameter than the side of the square portion 28, primarily for use with a carrier with one square and one round opening, such round opening being smaller than such square opening. For the sake of still further illustration, it may be assumed that a spindle is constructed with portions of the same shape, either square or round or hexagonal or of any other contour, corresponding to both the sections 28 and 29 of Figures 11 and 12, primarily for use with a carrier having an opening upon one side of less size than the opening upon the other side but of the same contour. According to the present invention, for cooperation with such a spindle, a carrier as described and claimed herein could be constructed with uniform spindle-receiving openings, each sufficiently large to accommodate the larger portion of the spindle, and a disc 8 provided with an opening of a size corresponding to that of the smaller portion 29 of such a spindle. It will be readily understood therefore that such a carrier may be placed upon such a spindle either side outwardly, the disc 8 definitely and pre-determinedly positioning the carrier radially to the axis of the spindle and in coaxial relation thereto and, in accordance with its thickness, which may be made as desired, also, if desired, positioning the carrier along the axis of the spindle. Further illustration of the application of our invention to the compensation of difference of dimension and contour between spindle openings in the carrier and the carrier mount portion of the spindle are believed unnecessary as they will be obvious to any one skilled in the art and are included within the scope of our broader claims.

It will be readily understood that the disc element if preferably so constructed as to insure contact between its periphery and the interior of the hub whereby gravitational or accidental movement of the disc relative to the hub is prevented although the disc element is freely movable within such hub when the spindle bears against it. No matter into which side opening of the carrier the spindle is introduced, the compensating element at once finds its proper place.

The operation of a carrier to which we add a compensating element of the resilient type is similar. The spring portion which projects into the spindle receiving opening is adapted to be deflected by the spindle to the extent required to compensate for differences between the spindle diameter and contour and the dimensions and contour of the carrier openings.

It will be readily understood that either type of compensating means is automatically effective during the mounting of the carrier to which they have been applied to position on a spindle. Compensating means of the resilient type make carriers to which they are applied adapted for use with spindles of a wide range of diameters and of contours. Compensating means of the disc type make reels to which they are applied adapted for use with spindles of different dimensions and contours. Carriers employing compensating means according to our invention may be utilized either with spindles having the characteristics herein shown or with many other spindles.

Certain advantages of our invention have been set forth above, and throughout this specification. Other advantages include the provision of inexpensive carriers with cheaply constructed compensating elements which permit the use of such carriers upon a wide variety of spindles, such compensating elements not only compensating for differences of dimension and contour but also establishing and maintaining proper positioning of the carriers upon the spindles and proper driving connection therebetween.

We claim:

1. In combination, a spindle and a carrier adapted to be removably mounted thereupon over an end thereof, the spindle having a carrier mount portion and the carrier having side plates formed with openings of contour different from that of said carrier mount portion of the spindle, and compensating means mounted upon said carrier and constructed to be rendered automatically effective as the carrier is placed upon the spindle both for compensating for such dimensional differences between said mount portion and said openings and also for cooperating with the spindle to limit the movement of the carrier along the axis of the spindle.

2. In combination, a spindle, a carrier adapted to be removably mounted upon the spindle over an end thereof, and a compensating member, the spindle having a carrier mount portion, the carrier having side plates at least one of which is formed with an opening of contour different from that of said carrier mount portion of the spindle, and said compensating member being mounted upon the carrier and constructed to be moved by the movement of the carrier over the end of the spindle to a position wherein it is effective both for compensating for such dimensional differences between said mount portion and said opening and also for cooperating with the spindle to limit the movement of the carrier along the axis of the spindle.

3. In combination, a spindle, a carrier adapted to be removably mounted upon the spindle over an end thereof, and a compensating member, the spindle having a carrier mount portion, the carrier having side plates formed with openings of contour different from that of said carrier mount portion of the spindle, and said compensating member being mounted upon the carrier and constructed to be bodily moved by the movement of the carrier over the end of the spindle to a position adjacent one of said openings wherein it is effective for compensating for such dimensional differences between said mount portion and said openings.

4. In combination, a spindle and a carrier adapted to be removably mounted thereupon over an end thereof for rotation therewith, said spindle being in driving engagement with said carrier, the spindle having a carrier mount portion adapted to cooperate with openings of different contours in the carrier and the carrier having side plates formed with such openings, and compensating means mounted upon the carrier and constructed to become automatically effective as the carrier is placed upon the spindle both for compensating for dimensional differences between said mount portion and said openings and also for cooperating with said spindle for maintaining the carrier in the desired position upon the axis of the spindle during the rotation of the carrier by the spindle.

5. In combination, a spindle, a carrier, and a compensating member, the spindle having a carrier mount portion, said spindle being in driving engagement with said carrier, the carrier having side plates formed with openings of contour different from that of said carrier mount portion of the spindle, and said compensating member being mounted upon the carrier and constructed to be moved by the movement of the carrier over the end of the spindle to a position wherein it is effective both for compensating for such differences in contour between said mount portion and said openings and also for maintaining contact between the carrier and the spindle whereby the carrier may be revolved by the spindle.

6. In combination, a spindle, a carrier adapted to be removably mounted upon the spindle over an end thereof, and a compensating member, the spindle having a carrier mount portion, the carrier having side plates of which at least one is formed with openings of dimensions greater than the corresponding dimensions of the carrier mount portion of the spindle, and said compensating member being mounted upon the carrier and constructed to be moved by the movement of the carrier over the end of the spindle to a position wherein it is effective both for compensating for such dimensional differences between said mount portion and said openings and also for maintaining the carrier in coaxial relation with the spindle.

7. In combination, a spindle adapted to cooperate with openings in a carrier, a carrier having at least one opening of a contour different from that of said spindle, and a member mounted upon said carrier and bodily movable by the act of placing said carrier upon said spindle to a position wherein it is effective for compensating for such difference in contour.

8. In combination, a spindle adapted to cooperate with openings in a carrier, a carrier having at least one opening of a contour different from that of said spindle, and a member mounted upon said carrier and constructed to be bodily movable relatively to said carrier, by the movement of the carrier along the axis of the spindle, to a position wherein it compensates for such difference in contour.

9. In combination, a spindle adapted to cooperate with openings in a carrier, a carrier having at least one opening of a dimension different from that of said spindle, and a member mounted upon said carrier and constructed to be bodily movable relatively to said carrier, by the movement of the carrier along the axis of the spindle, to a position wherein it compensates for such difference in dimension.

10. As an article of manufacture, a carrier including side plates, a hub extending between said side plates, and a disc placed loosely within said hub and movable therein, said side plates and said disc having coaxial openings.

11. In combination, a spindle and a carrier for cooperation therewith, said carrier having side plates, each of said side plates having a spindle receiving opening therein, and a resilient member mounted upon one of said side plates and so positioned thereupon as to project within said spindle receiving opening for cooperation with said spindle as said spindle is introduced therewithin.

12. In combination, a spindle and a carrier for cooperation therewith, said carrier having side plates, each of said side plates having a spindle receiving opening therein, and a leaf spring mounted upon one of said side plates parallel to the surface thereof and projecting within said spindle receiving opening for cooperation with said spindle as it is introduced therewithin.

13. In combination, a spindle, a carrier adapted to be removably mounted upon the spindle over an end thereof, and a compensating member, the spindle having a carrier mount portion, the carrier including a hub, side plates mounted upon said hub normal thereto, said side plates being formed with openings of contour different from that of said carrier mount portion of the spindle, and said compensating member being mounted within the interior of said hub for movement therewithin in a direction substantially parallel to the axis of said carrier.

14. In combination, a spindle, a carrier adapted to be removable mounted upon the spindle over an end thereof, and a compensating member, the spindle having a carrier mount portion, the carrier including a hub, side plates mounted upon said hub normal thereto, said side plates being formed with at least one opening of contour different from that of said carrier mount portion of the spindle, and said compensating member being mounted within the interior of said hub and constructed to be bodily moved by the movement of the carrier over the end of the spindle to a position relatively adjacent said opening wherein it is effective both for compensating for such dimensional differences between said mount portion and said openings and also for cooperating with the spindle to maintain the carrier in a predetermined relation to the spindle.

15. In combination, a spindle having a carrier mount portion, and a carrier, said carrier comprising a substantially cylindrical hub with an axial opening therein, said axial opening being substantially larger than the carrier mount portion of said spindle, said hub supporting two axially spaced side plates with axial spindle receiving openings therein, said axis of said openings being the same as the axis of said hub, and a compensating element freely movable within said hub between said side plates, said compensating element having an opening coaxial with said hub and with the openings of said side plates.

16. In combination, a spindle, a carrier adapted to be removably mounted thereon, said carrier including a hub and two side plates supported thereby, and means for axially positioning said carrier upon said spindle, said means comprising a disc positioned within said hub of a diameter substantially the same as that of said hub and movable longitudinally therewithin between said side plates.

17. As an article of manufacture, a carrier including side plates, a hub extending between said side plates, and a disc placed loosely within said hub and movable therewithin, said side plates having square openings therein and said disc having a round opening therein, said openings being coaxial.

18. As an article of manufacture, a carrier including side plates, a hub extending between said side plates and supporting said side plates, and a disc placed loosely within said hub and movable therein, said side plates and said disc having openings therein so that said carrier may be removably mounted upon a spindle.

19. In combination, a spindle having a carrier mount portion, and a carrier comprising two axially spaced side plates provided with spindle receiving openings therein, and a movable element constructed to be moved into cooperative relation with one of said openings as said carrier is placed upon said spindle and adapted to hold said carrier in the desired position relative to the axis of said spindle.

20. In combination, a spindle having a carrier mount portion, and a carrier, said carrier comprising two axially fixed spaced side plates provided with spindle receiving openings therein, and a movable disc therebetween having a spindle receiving opening therein adapted to hold said carrier in the desired position relative to the axis of said spindle.

21. In combination, a spindle having a carrier mount portion, and a carrier comprising two axially fixed spaced side plates, said side plates having spindle receiving openings therein, and a movable element adapted to compensate for dimensional differences between said spindle and the openings in said plates, said element being positioned between said side plates and having a spindle receiving opening therein.

22. In combination, a spindle adapted to cooperate with openings in a carrier, a carrier having at least one opening of different dimension from that of said spindle, and means mounted upon said carrier for bodily movement by the movement of said carrier along the axis of said spindle to a position adjacent said opening wherein it compensates for such difference in dimension.

23. In combination, a spindle adapted to cooperate with openings in said carrier, said spindle having driving engagement with said carrier, a carrier having at least one opening of a dimension different from that of said spindle, and means mounted upon said carrier and so constructed and arranged as to be rendered operative by the movement of said carrier along the axis of said spindle to compensate for such differences in dimension and to maintain contact between said carrier and said spindle whereby said carrier may be revolved by said spindle.

24. In combination, a spindle and a carrier adapted to be removably mounted thereupon over an end thereof for rotation therewith, the spindle having a carrier mount portion adapted to cooperate with openings of different contours in the carrier and the carrier having side plates formed with such openings and compensating means, mounted upon the carrier and movable relatively thereto, constructed both to compensate for dimensional differences between said mount portion and said openings and also to cooperate with said spindle in maintaining the axis of the carrier in parallel relation to the axis of the spindle during the rotation of the carrier by the spindle.

Signed at New York city, in the county of New York and State of New York, this 28th day of December A. D. 1928.

WARREN DUNHAM FOSTER.
CLARKSON ULYSSES BUNDICK.